United States Patent
Davis et al.

(10) Patent No.: US 12,145,517 B2
(45) Date of Patent: Nov. 19, 2024

(54) FLEXIBLE ALUMINUM BUSBAR

(71) Applicant: Our Next Energy, Inc., Novi, MI (US)

(72) Inventors: Jason Davis, Livonia, MI (US); Najah George, Farmington Hills, MI (US)

(73) Assignee: Our Next Energy, Inc., Novi, MI (US)

(*) Notice: Subject to any disclaimer, the term of this patent is extended or adjusted under 35 U.S.C. 154(b) by 201 days.

(21) Appl. No.: 17/975,518

(22) Filed: Oct. 27, 2022

(65) Prior Publication Data

US 2023/0137286 A1    May 4, 2023

Related U.S. Application Data

(60) Provisional application No. 63/263,206, filed on Oct. 28, 2021.

(51) Int. Cl.
*B60R 16/03* (2006.01)
*H01B 1/02* (2006.01)

(52) U.S. Cl.
CPC .............. *B60R 16/03* (2013.01); *H01B 1/023* (2013.01)

(58) Field of Classification Search
None
See application file for complete search history.

(56) References Cited

U.S. PATENT DOCUMENTS

| | | | |
|---|---|---|---|
| 9,853,435 B1* | 12/2017 | Burkman | H01M 10/6551 |
| 10,243,191 B2* | 3/2019 | Mattmuller | H01M 50/517 |
| 2013/0157113 A1* | 6/2013 | Yoshioka | H02G 5/00 174/68.2 |
| 2014/0144668 A1* | 5/2014 | Walgenbach | H02G 5/10 174/68.2 |
| 2015/0380908 A1 | 12/2015 | Hwang | |
| 2018/0026250 A1 | 1/2018 | Mattmuller | |
| 2023/0154644 A1* | 5/2023 | Dawson | H01M 50/505 174/75 R |

FOREIGN PATENT DOCUMENTS

| | | |
|---|---|---|
| CN | 106486865 | 3/2017 |
| CN | 106601361 | 4/2017 |
| EP | 2813592 | 12/2014 |
| EP | 3020500 | 5/2016 |
| KR | 20210050255 | 5/2021 |

* cited by examiner

*Primary Examiner* — Krystal Robinson
(74) *Attorney, Agent, or Firm* — Butzel Long

(57) ABSTRACT

A busbar that includes a low profile, flexible body made of aluminum layers stacked together on their longitudinal surfaces. The aluminum layers are laser welded together and are designed to have an offset at a middle portion such that the middle portion has a raised profile. A method of laser welding the aluminum layers is also disclosed.

26 Claims, 11 Drawing Sheets

FLEXIBLE ALUMINUM BUSBAR

TECHNICAL FIELD

The present invention relates generally to a busbar for an electric vehicle. More particularly, the present invention relates to a flexible busbar made of aluminum and configured with a low profile to enable the fabrication of a compact battery pack assembly.

BACKGROUND

Vehicles such as battery-electric vehicles (BEVs) and plug-in hybrid-electric vehicles (PHEVs) contain an energy storage device, such as a high voltage battery in a battery pack assembly, to act as a propulsion source for the vehicle. The battery may include components and systems to assist in managing vehicle performance and operations. The battery may also include one or more arrays of battery cells interconnected electrically between battery cell terminals by intercellular connectors.

Intercellular connectors, which may include a system of electrical conductors for collecting and distributing current, provides the means to efficiently distribute power to the vehicles' various systems. A number of different types of Intercellular connectors including wires, cables, and busbars are commercially available. Busbars may have modular designs that allow for quicker and safer installation.

SUMMARY

The illustrative embodiments disclose a low-profile busbar for an electric vehicle battery pack assembly and a corresponding method. In one aspect, is disclosed. The busbar includes a body having a plurality of aluminum layers stacked together. The body has a first end, a second end opposite the first end, and a middle portion disposed between the first end and the second end, and the plurality of aluminum layers includes at least a first aluminum layer and a second aluminum layer stacked on one longitudinal surface of the first aluminum layer and secured to the first aluminum layer with one or more laser welds at the first and second ends. The plurality of aluminum layers may be designed to have an offset at the middle portion such that the middle portion has a raised profile relative to a profile of the first or second ends.

The busbar may also be designed to have an aluminum layer thickness, an offset radius of curvature and an offset height that jointly provide a defined flexibility of the busbar in a plurality of axes, and a continuous current carrying capacity ranging from 100 A to 500 A. The busbar may further comprise Aluminum 1100.

In one aspect, another busbar is disclosed that includes a body including a plurality of aluminum layers stacked together with the body having a first end, a second end opposite the first end, and a middle portion disposed between the first end and the second end. The plurality of aluminum layers may include at least a first aluminum layer and a second aluminum layer stacked on one longitudinal surface of the first aluminum layer and secured to the first aluminum layer with one or more laser welds at the first and second ends. The plurality of aluminum layers is configured to have a plurality of offsets at the middle portion such that the middle portion has a plurality of raised profiles relative to a profile of the first or second ends.

Other technical features may be readily apparent to one skilled in the art from the following figures, descriptions, and claims.

In one aspect, a method is disclosed. The method may include laser welding a plurality of aluminum layers together by preparing a busbar that includes at least a first aluminum layer and a second aluminum layer stacked on one longitudinal surface of the first aluminum layer, generating an offset at a middle portion of the busbar such that a profile of the middle portion of the busbar is raised relative to a profile of a first or second end of the busbar, and laser welding, the first aluminum layer to at least the second aluminum layer at the first and second ends of the busbar.

The method may also include laser welding using a laser device having a wavelength of about 1070 nm, a welding speed of about 20 mm/s, a laser power of about 1400W, a scan width of about 3 mm and a scan frequency of about 200 Hz. In other implementations, the method may include laser welding using a laser device having a power density ranging from 170 Kw/mm2 to 180 Kw/mm2 and a welding speed ranging from 20 mm/s to 25 mm/s, with a busbar thickness ranging from 1 mm to 4 mm and an offset height ranging from 1 mm to 4 mm.

The method may also include further includes laser welding the busbar to one or more aluminum cell terminals of a battery pack. Other technical features may be readily apparent to one skilled in the art from the following figures, descriptions, and claims.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

To easily identify the discussion of any particular element or act, the most significant digit or digits in a reference number refer to the figure number in which that element is first introduced. Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
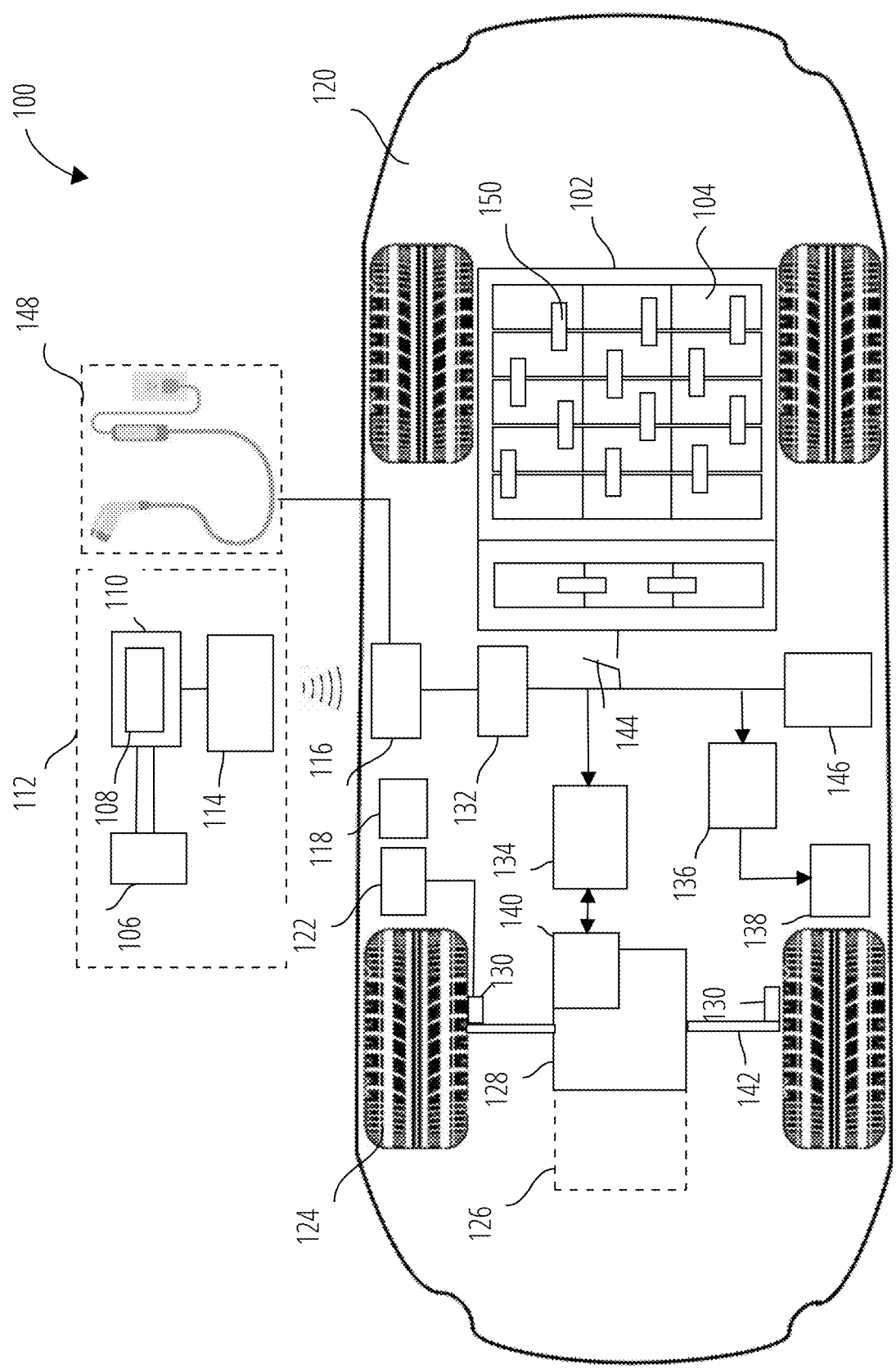
FIG. 1 depicts a drivetrain and energy storage components in accordance with illustrative embodiments.

Batteries for which high current levels are needed may have thicker busbars compared to conventional busbar sizes of batteries that deliver comparatively lower currents. As the thickness of a busbar increases the material stiffness of the busbar, i.e., a measure of how the busbar bends under load while still returning to its original shape once the load is removed, may increase by a cubic factor. This may require increasingly larger offsets of the busbar to maintain flexibility. An effect thereof may be a reduction in volumetric efficiency of the batteries. More specifically, a representation of the moment of inertia of a rectangular beam is:

$$I = \frac{bh^3}{12}$$

where h is the thickness of the rectangular beam and b is the width of the rectangular beam. Further, the basic equation for deflection of a cantilever beam is:

$$\delta_B = \frac{FL^3}{3EI}$$

At a given deflection, as the moment of inertia (I) increases, the force (F) may also need to increase by the same ratio. Since I is a function of $h^3$, the thickness may have a cubed impact on the stiffness of the busbar. It may be desirable therefore, to have a bus bar with low stiffness so that it may be able to flex without exerting too large a force back on to the busbar-to-cell-terminal weld.

The illustrative embodiments recognize that connections between battery cells or modules may be essential parts of a battery pack assembly design that may affect thermal stability, electrical protection and volumetric energy density. Conventional intercellular connections may occupy excessively large volumes in battery pack assemblies. Connections such as those comprising wires, cables, lugs and even conventional busbars are susceptible to failure and short circuits when the cells even slightly dislocate during operation, for example, due to the heating and cooling of cells or vibrations of a moving vehicle combined with lack of flexibility in the connections. The illustrative embodiments further recognize that arbitrarily introducing offset structures in busbars to add flexibility may require increasing offset heights, and thus the vertical heights of the busbars, to values that unnecessarily increase the volume occupied by the busbars in the battery pack assembly, resulting in a corresponding decrease in volumetric energy density of the battery pack assembly. Further, any requirements for high continuous current capacities of the busbars than is conventional (e.g., a continuous current carrying capacity of 220 A or more) may require increasing a thickness of the busbar, which may result in decreased flexibility unless an offset with a high offset height is introduced. Thus, an incongruous relationship may exist between a vertical height of the busbar (i.e., thickness and/or offset height, and thus the busbar volume and volumetric energy density of the battery pack assembly), flexibility of the busbar (and thus safety and longevity of the battery pack assembly), and a continuous current carrying capacity of the busbar. That is, increasing a continuous current carrying capacity of the busbar from a base value may involve increasing a thickness of the busbar which may decrease flexibility of the busbar and thus decrease the safety of the pack. Countering this by increasing an offset height of the busbar, while possibly successful restoring the flexibility, may decrease the compactness and thus volumetric energy density of the pack. Further, it may be desirable to minimize a temperature rise of the bus bar during high continuous currents since the busbar may transfer said heat back into the cell and potentially damage it (e.g., in an illustrative embodiment, a maximum of at most 15° C. temperature rise on the busbar over ambient temperature may be tolerable). Further, it may be desirable to minimize a resistance of the busbar as the resistance may produce system losses during charging and discharging and cause the battery to lose energy efficiency.

The illustrative embodiments described herein are directed to a busbar 150 having a low profile configured to aid in the production of an optimal volumetric efficiency of a battery pack assembly that contains the busbar 150. One or more embodiments provide a busbar 150 configured to have an aluminum layer thickness, an offset radius of curvature and an offset height that jointly provide a defined flexibility of the busbar in a plurality of axes, and a high continuous current carrying capacity of between 100 A to 500 A, or between 200 A to 250. In one or more embodiments the defined flexibility may refer to a minimum deflection of the busbar of 0.2 mm without needing to apply more than 300N each of opposing forces (336, 338 as shown in FIG. 3C) on the cell terminal welds.

One of more embodiments further generate one or more offsets of the busbar 150 to occupy a minimized vertical profile in comparison to conventional flexible busbars, based on selecting a defined radius of curvature and offset height combination that jointly provide both the defined flexibility of the busbar 150 in a plurality of axes while maintaining or increasing volumetric energy density.

The busbars 150 may be configured electrically to handle not only high currents coming from the cells but also increasing voltage levels. Mechanically, the busbars 150 may be designed to be durable, capable of withstanding high levels of vibration, while simultaneously providing enough rigidity to keep the integrity of the battery pack assembly, especially those with cell-to-pack configurations, while also being flexible enough to cope with elastic, thermal and G-forces. In a cell-to-pack configuration, battery cells are arranged directly inside sidewalls without the use of separate battery modules to house the cells. Alternatively, the busbars may be used in battery modules without a cell-to-pack configuration.

One or more embodiments further employ a plurality thin aluminum layers or foils to form a body of the busbar 150 as described hereinafter by reference to the accompanying figures. Using a plurality of thin aluminum layers may allow and a small offset may allow the formation of a busbar 150 with a low profile that supports high current capacity needs.

In one or more other embodiments, a method of welding the plurality of thin aluminum layers, which have hitherto been unknown to be weldable is shown. The embodiments recognize that well designed busbars are essential components of a compact battery pack assembly and the selection of the busbars is not always as simple as one might think. It is an exceptionally arduous task in busbar designs to properly weld thin aluminum foils/layers together while maintaining structural integrity. Having generally described the busbar 150 and methods thereof, examples and systems will now be described in more detail.

Turning to FIG. 1, a schematic of a generalized electric vehicle system 100 in which a busbar 150 of a battery pack assembly 102 may be housed will be described. It will become apparent to a person skilled in the relevant art(s) that the concepts described herein are directed to busbars used in all electrified/electric vehicles, including, but not limited to, battery electric vehicles (BEV's), plug-in hybrid electric vehicles, motor vehicles, railed vehicles, watercraft, and aircraft configured to utilize rechargeable electric batteries as their main source of energy to power their drive systems propulsion or that possess an all-electric drivetrain.

The electric vehicle 120 may comprise one or more electric machines 140 mechanically connected to a transmission 128. The electric machines 140 may be capable of operating as a motor or a generator. In addition, the transmission 128 may be mechanically connected to an engine 126, as in a PHEV. The transmission 128 may also be mechanically connected to a drive shaft 142 that is mechanically connected to the wheels 122. The electric machines 140 can provide propulsion and deceleration capability when the engine 126 is turned on or off. The electric machines 140 also act as generators and can provide fuel economy benefits by recovering energy that would normally be lost as heat in the friction braking system. The electric machines 140 may also reduce vehicle emissions by allowing the engine 126 to operate at more efficient speeds and allowing the electric vehicle 120 to be operated in electric mode with the engine 126 off in the case of hybrid electric vehicles.

A battery pack assembly 102 stores energy that can be used by the electric machines 140. The battery pack assembly 102 typically provides a high voltage DC output and is electrically connected to one or more power electronics modules 134. In some embodiments, the battery pack assembly 102 comprises a traction battery and a range-extender battery. Cells 104 of the battery pack assembly 102 may be electrically coupled by busbars 150 described herein. One or more contactors 144 may isolate the battery pack assembly 102 from other components when opened and connect the battery pack assembly 102 to other components when closed. To increase the energy densities available for electric vehicles, a structure of the busbars 150 is configured to eliminate unnecessary use of space as described hereinafter. The battery pack assembly may also have a cell-to-pack configuration. For example, a battery pack configuration may include cells directly placed in an enclosure without the use of separate modules, with the enclosure also housing other hardware such as, but not limited to the power electronics module 134, DC/DC converter module 136, system controller 118 (such as a battery management system (BMS)), power conversion module 132, battery thermal management system (cooling system and electric heaters) and contactors 144. By minimizing a vertical height of the busbars 150 in a pack for which high continuous current carrying capacities relative to conventional packs are needed (e.g., 220 A or more), a consolidated arrangement is provided that allows space otherwise occupied by unusually tall offsets in the busbars to be saved and a volumetric energy density increased without sacrificing flexibility and safety provided by the busbar 150.

The power electronics module 134 is also electrically connected to the electric machines 140 and provides the ability to bi-directionally transfer energy between the battery pack assembly 102 and the electric machines 140. For example, a traction or range-extender battery may provide a DC voltage while the electric machines 140 may operate using a three-phase AC current. The power electronics module 134 may convert the DC voltage to a three-phase AC current for use by the electric machines 140. In a regenerative mode, the power electronics module 134 may convert the three-phase AC current from the electric machines 140 acting as generators to the DC voltage compatible with the battery pack assembly 102. The description herein is equally applicable to a BEV. For a BEV, the transmission 128 may be a gear box connected to an electric machine 14 and the engine 126 may not be present.

In addition to providing energy for propulsion, the battery pack assembly 102 may provide energy for other vehicle electrical systems. A typical system may include a DC/DC converter module 136 that converts the high voltage DC output of the battery pack assembly 102 to a low voltage DC supply that is compatible with other vehicle loads. Other electrical loads 146, such as compressors and electric heaters, may be connected directly to the high voltage without the use of a DC/DC converter module 136. The low-voltage systems may be electrically connected to an auxiliary battery 138 (e.g., 116V battery). The illustrative embodiments recognize that due to the numerous components that make up the drivetrain of the electric vehicle being in contact with the battery pack assembly, and heating and cooling of cells of the battery pack assembly conditions, it is desirable maximize safety and longevity of the battery pack assembly through flexible busbars while making judicious use of space to enhance volumetric efficiency.

The battery pack assembly 102 may be recharged by a charging system such as a wireless vehicle charging system 112 or a plug-in charging system 148. The wireless vehicle charging system 112 may include an external power source 106. The external power source 106 may be a connection to an electrical outlet. The external power source 106 may be electrically connected to electric vehicle supply equipment 110 (EVSE). The electric vehicle supply equipment 110 may provide an EVSE controller 108 to provide circuitry and controls to regulate and manage the transfer of energy between the external power source 106 and the electric vehicle 120. The external power source 106 may provide DC or AC electric power to the electric vehicle supply equipment 110. The electric vehicle supply equipment 110 may be coupled to a transmit coil 114 for wirelessly transferring energy to a receiver 116 of the vehicle 120 (which in the case of a wireless vehicle charging system 112 is a receive coil). The receiver 116 may be electrically connected to a charger or on-board power conversion module 138. The receiver 116 may be located on an underside of the electric vehicle 120. In the case of a plug-in charging system 148, the receiver 116 may be a plug-in receiver/charge port and may be configured to charge the battery pack assembly 102 upon insertion of a plug-in charger. The power conversion module 132 may condition the power supplied to the receiver 116 to provide the proper voltage and current levels to the battery pack assembly 102. The power conversion module 132 may interface with the electric vehicle supply equipment 110 to coordinate the delivery of power to the electric vehicle 120.

One or more wheel brakes 130 may be provided for decelerating the electric vehicle 120 and preventing motion of the electric vehicle 120. The wheel brakes 130 may be hydraulically actuated, electrically actuated, or some combination thereof. The wheel brakes 130 may be a part of a brake system 122. The brake system 122 may include other components to operate the wheel brakes 130. For simplicity, the figure depicts a single connection between the brake system 122 and one of the wheel brakes 130. A connection between the brake system 122 and the other wheel brakes 128 is implied. The brake system 122 may include a controller to monitor and coordinate the brake system 122. The brake system 122 may monitor the brake components and control the wheel brakes 130 for vehicle deceleration. The brake system 122 may respond to driver commands and may also operate autonomously to implement features such as stability control. The controller of the brake system 122 may implement a method of applying a requested brake force when requested by another controller or sub-function.

One or more electrical loads 146 may be connected to the busbars 150. The electrical loads 146 may have an associated controller that operates and controls the electrical loads 146 when appropriate. Examples of electrical loads 146 may be a heating module or an air-conditioning module.

Figure 2:
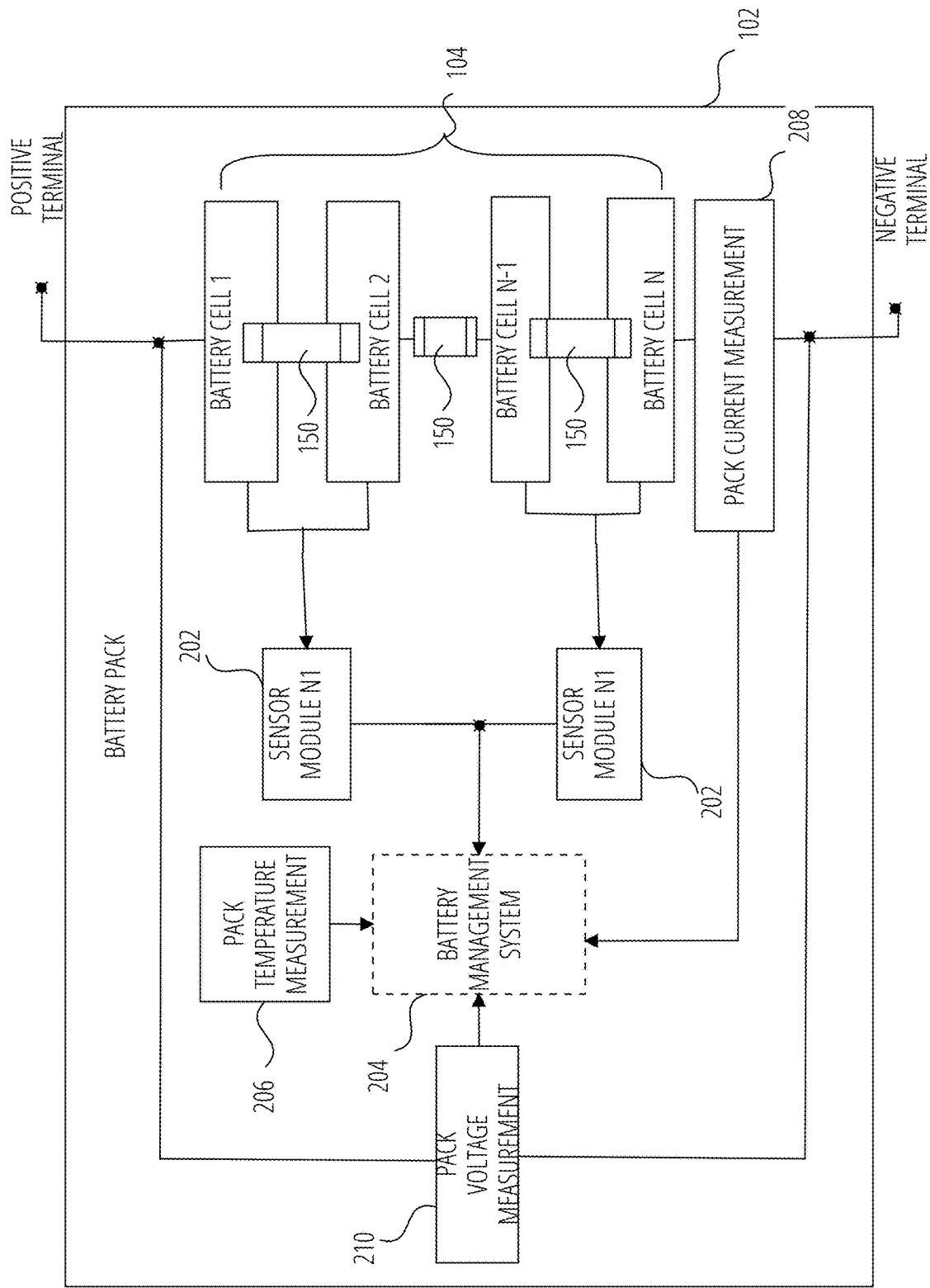
FIG. 2 depicts a diagram of a battery pack arrangement in accordance with an illustrative embodiment.

The battery pack assembly 102 may be constructed from a variety of chemical formulations, including, for example, lead acid, nickel-metal hydride (NIMH) or Lithium-Ion. FIG. 2 shows a schematic of the battery pack assembly 102 in a simple series configuration of N cells 104. Other battery pack assembly 102, however, may be composed of any number of individual battery cells connected in series or parallel or some combination thereof. The battery pack assembly 102 may have a one or more low profile, flexible busbars 150 connecting the cells 104. The battery pack assembly 102 may also have controllers such as the Battery management system (BMS 204) that monitors and controls the performance of the battery pack assembly 102. The BMS 204 may monitor several battery pack level characteristics such as pack current 208, pack voltage 210 and pack temperature 206. The BMS 204 may have non-volatile memory such that data may be retained when the BMS 204 is in an off condition. Retained data may be available upon the next key cycle.

In addition to monitoring the pack level characteristics, there may be cell 104 level characteristics that are measured and monitored. For example, the terminal voltage, current, and temperature of each cell 104 may be measured. A system may use a sensor module(s) 202 to measure the cell 104 characteristics. Depending on the capabilities, the sensor module(s) 202 may measure the characteristics of one or multiple of the cells 104. Each sensor module(s) 202 may transfer the measurements to the BMS 204 for further processing and coordination. The sensor module(s) 202 may transfer signals in analog or digital form to the BMS 204. In some embodiments, the sensor module(s) 202 functionality may be incorporated internally to the BMS 204. That is, the sensor module(s) 202 hardware may be integrated as part of the circuitry in the BMS 204 and the BMS 204 may handle the processing of raw signals.

It may be useful to calculate various characteristics of the battery pack. Quantities such as a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive for the next specified time period, for example, 1 second or less than one second. Knowing the battery power capability allows electrical loads to be managed such that the power requested is within limits that the battery can handle.

Battery pack state of charge (SOC) gives an indication of how much charge remains in the battery pack. The battery pack SOC may be output to inform the driver of how much charge remains in the battery pack, similar to a fuel gauge. The battery pack SOC may also be used to control the operation of an electric vehicle. Calculation of battery pack or cell SOC can be accomplished by a variety of methods. One possible method of calculating battery SOC is to perform an integration of the battery pack current over time. Calculation of battery pack or cell SOC can also be accomplished by using an observer, whereas a battery model is used for construction of the observer, with measurements of battery current, terminal voltage, and temperature. Battery model parameters may be identified through recursive estimation based on such measurements. The BMS 204 may estimate various battery parameters based on the sensor measurements. The BMS 204 may further ensure by way of the pack current 208 that a current of the cells 104 does not exceed a defined continuous current carrying capacity of the busbars 150.

Figure 3A:
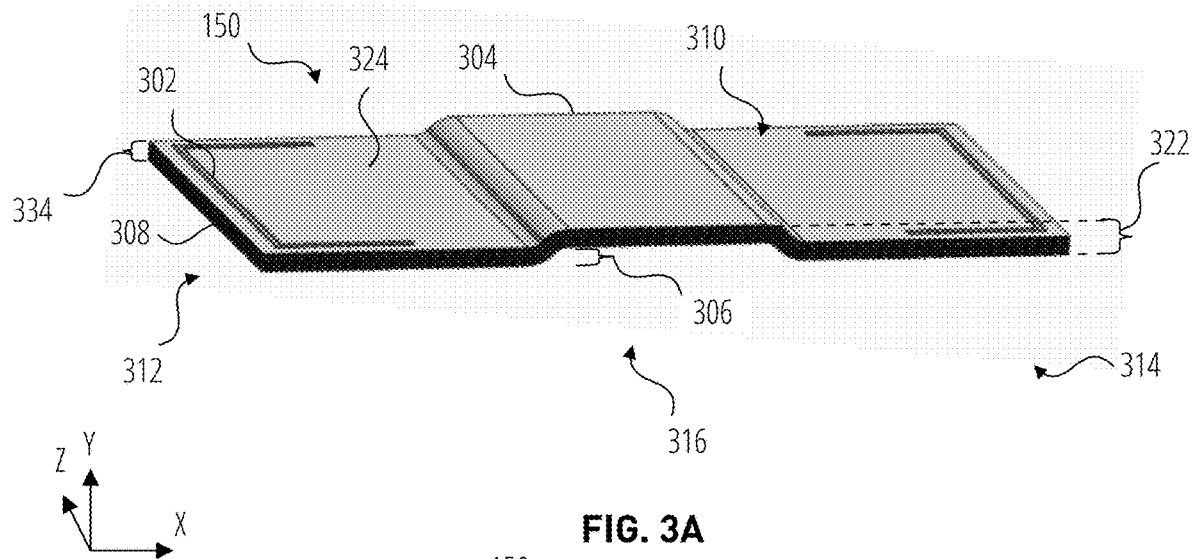
FIG. 3A depicts a perspective view of a busbar in accordance with an illustrative embodiment.
Figure 3B:
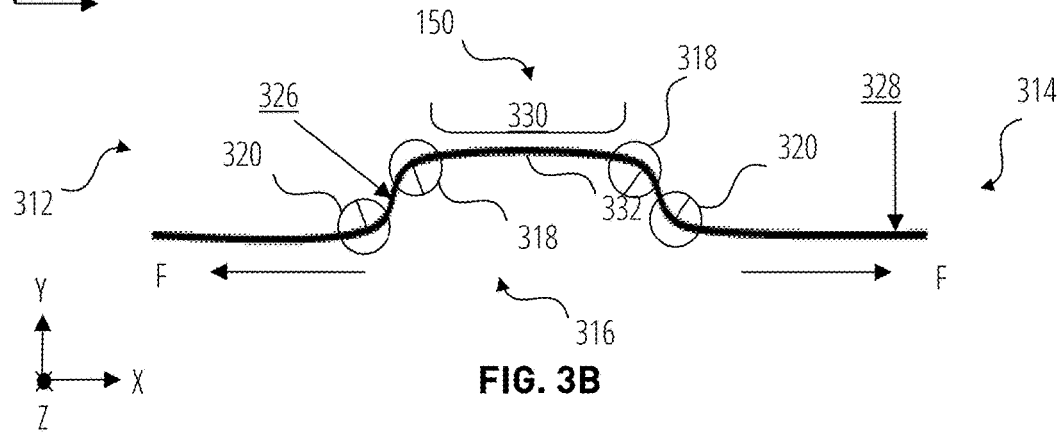
FIG. 3B depicts a two-dimensional view of a front end of a busbar in accordance with an illustrative embodiment.
Figure 3C:
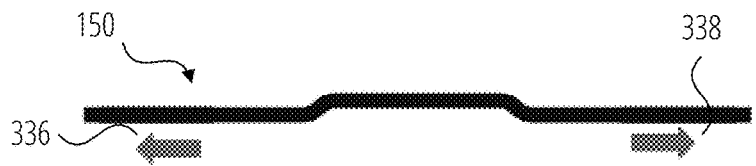
FIG. 3C depicts a two-dimensional view of a busbar showing opposing forces.
Figure 3C:
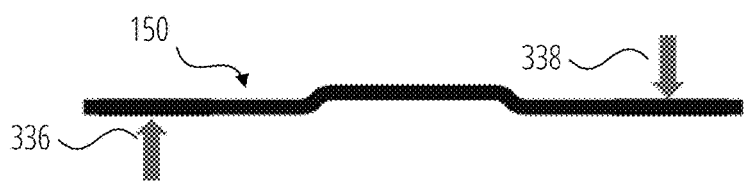

FIG. 3A shows a perspective view of a busbar 150 in accordance with one or more embodiments. The busbar 150 may comprise a body 310 that includes a plurality of thin aluminum layers 308 stacked together. The body 310 may have a first end 312, a second end 314 opposite the first end, and a middle portion 316 disposed between the first end 312 and the second end 314. The plurality of aluminum layers 308 includes at least a first aluminum layer and a second aluminum layer stacked on one longitudinal surface 324 of the first aluminum layer (in the X-Z plane as shown in FIG. 3A). The aluminum layers 308 may be secured together with one or more laser welds 302 at the first and second ends. Further, the aluminum layers 308 may be configured to have an offset at the middle portion such that the middle portion has a raised profile 326 relative to a level profile 328 of the first or second ends as shown in FIG. 3B. The body 310 is configured to be thin enough to provide a low profile to the busbar without compromising on a continuous current carrying capacity of the busbar 150. This may be achieved by providing a thickness of the individual aluminum layers 308, an inner radius of curvature 318 and/or outer radius of curvature 320 (collectively referred to herein as an offset radius of curvature) and an offset height 306 that jointly provide a defined flexibility of the busbar in a plurality of axes, as well as a high continuous current carrying capacity of about 100 A to 500 A (e.g., between 200 A and 250 A, pulses at higher rates may be achieved).

As shown in FIG. 3B, forces (F) may be applied to the busbar 150 due to, for example, movement of cells relative to other, vibrations and thermal expansions and contractions. The busbar 150 may flex 330 along the top 332 of the offset 304 as well as around each of the offset radii of curvature.

If the busbar was rigid, solid (one thick layer) and flat, when there is movement (e.g., 0.2 mm of movement) of the first and second ends relative to each other, the forces would be high enough, and in tension (along the length of the rigid, flat busbar) to cause bonds between cell terminals and the busbars and/or bonds between cell electrodes and cell terminals to sever. By introducing the offset, the forces exerted on the bonds may become reduced. The higher the offset height 306, and the longer the length (in the X-direction) of the top 332 is, the more deflection the busbar experiences and the lower the forces exerted on the bonds are. In an illustrative embodiment, the top 332 is about 22 mm long in the X-direction. Further, as busbar technology advances, the continuous current carrying capacity of the busbars may get increasingly higher. Higher currents may require higher busbar thicknesses 334 and the thicker the busbar, the harder it may be for the busbar to flex. This may be mitigated by increasing the offset height 306 to maintain flexibility. For example, a solid busbar of 0.8 mm to 1 mm thick may require a tall offset of about 4-6 mm to prevent bonds/electrical connections from severing and a thicker solid busbar of about 2 mm for which high continuous current carrying capacities are desired may require an offset of about 8-12 mm or more to prevent bonds from severing. These high offsets relative to the busbar thicknesses may introduce additional unusable volume in a battery pack assembly and result in a decrease the compactness and volumetric energy density relative to the same assembly with flat busbars. Using a plurality of aluminum layers 308 to form the body 310 may aid in maintaining a low profile without compromising on flexibility as discussed herein.

Figure 4:
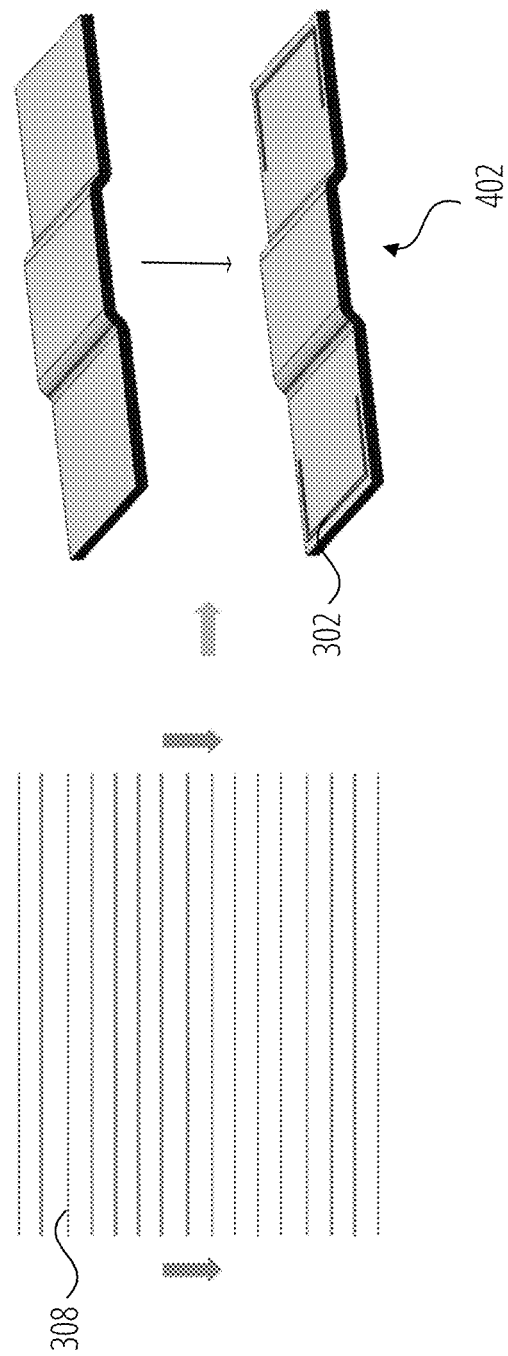
FIG. 4 depicts layers of a busbar in accordance with an illustrative embodiment.

FIG. 4 depicts aluminum layers 308 that may form the busbar according to one or more embodiments. Aluminum is lightweight and may be cheaply obtained. Moreover, unlike copper, aluminum may not require plating to weld together. Thin layers of aluminum foils/layers may be formed, stamped to obtain the offset 304 and then laser welded at the ends to hold the layers together prior to assembly into a battery pack or module. Stamping before welding may allow the individual layers to take form to prevent deformations in the busbar that may be caused by welding before stamping, i.e., by welding after forming the offset, the bus bar may hold its shape prior to assembly into the battery module or pack and prevent unnecessary stresses in the welds caused by forming after welding. A combination of the number of aluminum layers 308 and thickness of each layer, and thus of the busbar 150 may be chosen to maintain flexibility and low profile. The number of layers may range from 10 to 30 layers, or 15 to 20 layers. The thickness of each aluminum layer 308 may range from 0.05 mm to 0.2 mm or from 0.10 mm to 0.13 mm. The busbar thickness 334 may range from 1.2 mm to 4 mm or from 1.8 mm to 2.5 mm. Below is a table showing possible combinations of properties.

TABLE 1

| Busbar properties | |
|---|---|
| Property | Value |
| flexibility of the busbar | minimum deflection of the busbar of 0.2 mm without needing to apply more than 300N each of opposing forces on the cell terminal welds |
| radius of curvature | 0.5 mm to 5 mm; tighter range 1.0 mm to 2.0 mm |
| offset height | 1 mm to 4 mm; tighter range 1.5 mm to 3.0 mm |

TABLE 1-continued

Figure 6:
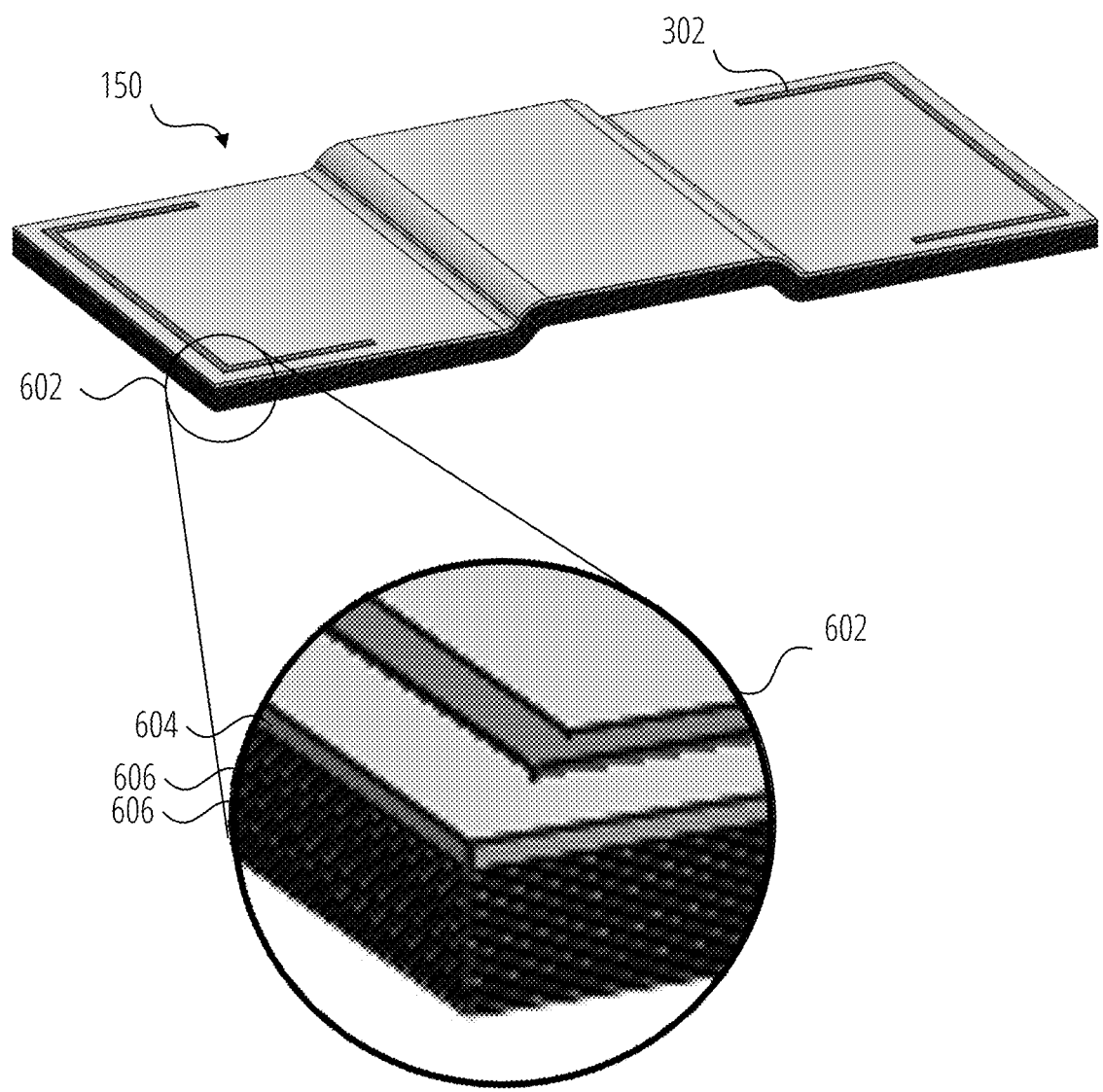
FIG. 6 depicts a perspective view of a busbar in accordance with an illustrative embodiment.

| Busbar properties | |
|---|---|
| Property | Value |
| number of aluminum layers stacked together | 10 to 30; tighter range 15 to 20 |
| thickness of an aluminum layer | 0.05 mm to 0.2 mm; tighter range 0.10 mm to 0.13 mm |
| busbar thickness | 1.2 mm to 4.0 mm; tighter range 1.8 mm to 2.5 mm |
| ratio of offset height to busbar thickness | 0.75:1 to 1.5:1 or 1:1 to 1.5:1 |
| continuous current carrying capacity of busbar | 100 A to 500 A; tighter range 200 A to 250 A |
| thickness of topmost aluminum layer (FIG. 6) | 0.4 mm to 0.5 mm |

Combinations of these properties have been found to provide unexpectedly low profiles and volumes for busbars 150 for which high continuous current carrying capacities are desired without compromising on flexibility of the busbars 150 and thus safety and longevity of the battery pack assembly 102. In some embodiments, each property may be selected such that none of the remaining properties fall outside the given ranges. In other embodiments a subset of the properties may be selected for a low-profile busbar design.

In one or more embodiments, the plurality of aluminum layers 308 comprise Aluminum 1100. In an example, the busbar thickness 334 may be 2 mm and the offset may be between 1.5 mm and 2 mm. In another example, the aluminum layer thickness of each layer is about 0.005 inches (0.127 mm) and the number of aluminum layers stacked together is 16. Due to the relatively thin aluminum layers or foils being use, a laser welding step of the layers which maintains the structure of the layers may be arduous and even ineffective without the right combination of laser welding parameters. The illustrative embodiments thus disclose a laser welding method hereinafter.

The embodiments disclosed are not meant to be limiting and other variations and technical features may be readily apparent to one skilled in the art from the figures and descriptions.

Figure 5A:
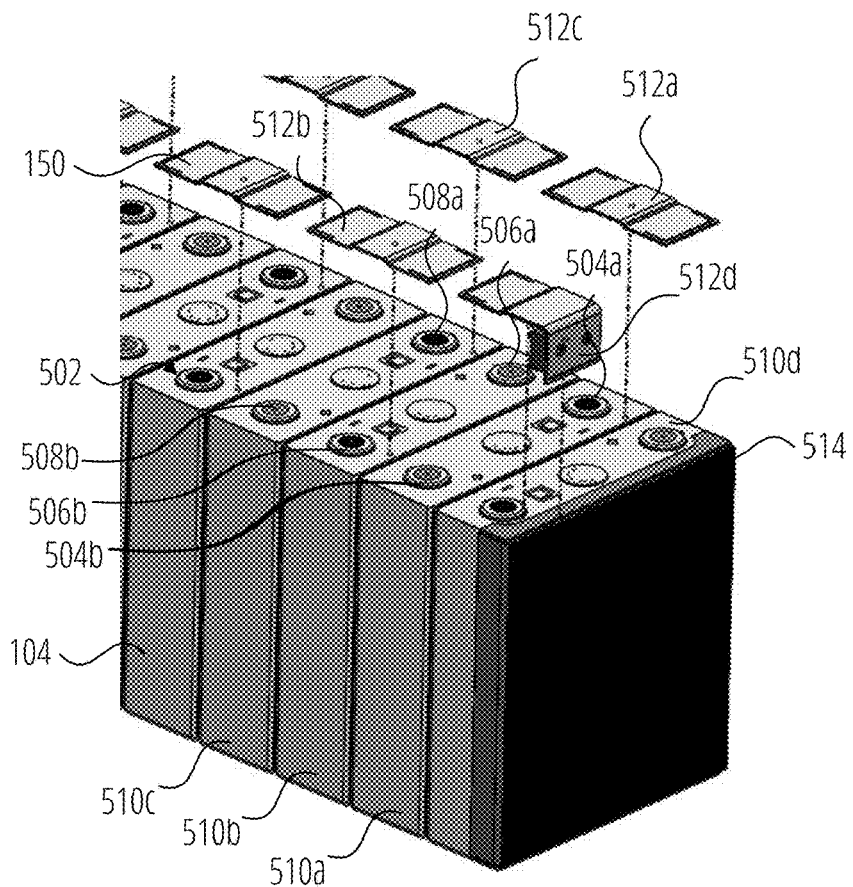
FIG. 5A depicts busbar connections to battery cells in accordance with an illustrative embodiment.
Figure 5B:
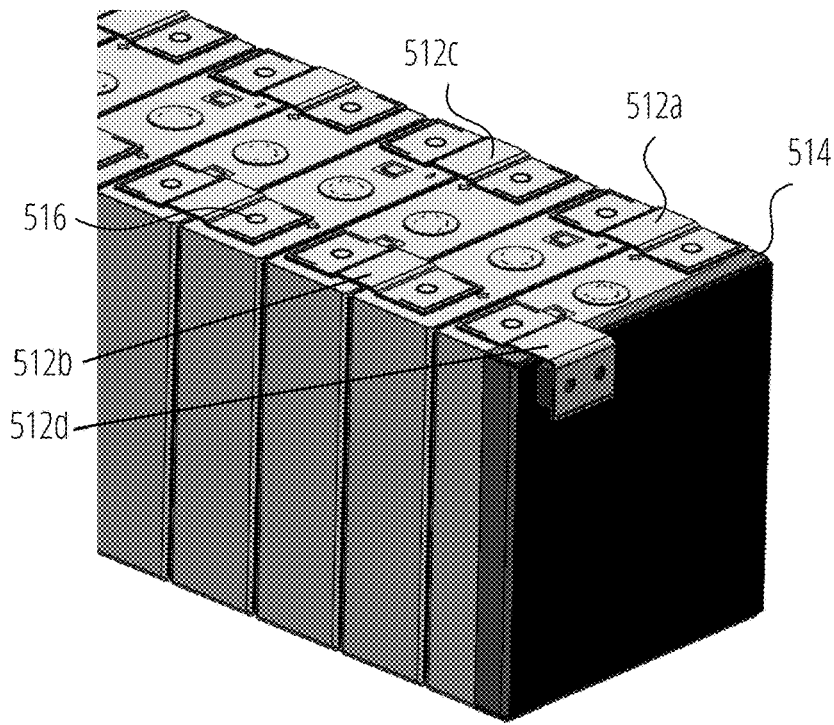
FIG. 5B depicts busbar connected to battery cells in accordance with an illustrative embodiment.

FIG. 5A and FIG. 5B illustrate a plurality of busbar 150 configured to connect a plurality of cells 104.

Busbars may electrically couple cells 104 in series or parallel combinations. Busbars 150 (e.g., end busbar 512d) may also be configured to bolt end cells (e.g., end cell 510d) to an electrical isolation 514. The low profile of the busbars may minimize the overall package space needed for height and width of busbars. The busbars 150 allow flexibility in multiple axes to accommodate cell to cell movement (from tolerances, vibration, cell growth during cycling). They may also minimize force on cell terminal welds and consolidation welds (inside the cell from electrode foils to cell terminal) during cell-to-cell movement. FIG. 5A shows battery pack comprising cells 104 that include a cell A 510a, a cell B 510b, a cell C 510c, an end cell 510d. The battery pack may also include busbars 150, and terminals 502 and an electrical isolation 514. The busbars include busbar 1 512a, busbar 2 512b, busbar 3 512c, and end busbar 512d. The terminals include positive terminal A 504a, a negative terminal A 504b, a negative terminal B 506a, a positive terminal B 506b, a positive terminal C 508a, a negative terminal C 508b. By laser welding busbar 2 512b to negative terminal A 504b and positive terminal B 506b though the foils of the busbar and into the terminals, cell A 510a is connected to adjacent cell B 510b in a series connection as shown in FIG. 5B. Of course, cells and busbars may be arranged in a myriad of ways to obtain series and/or parallel cell connections. Further, both positive and negative terminals of cells may typically be made of aluminum. By laser welding aluminum of the busbar to aluminum of the terminals, instead of laser welding different materials together, the laser welding process to obtain the busbar-terminal laser weld 516 is made easier, stronger and more efficient. Further, no intermetallic layer (usually brittle) is generated between the aluminum of the busbar and the aluminum of the terminals unlike in conventional welds. In some embodiments, the end busbar 512d has a nut plate. A pack wire bus bar may get bolted through the busbar into the nut plate to clamp the end busbar to the pack wiring/busbar.

The busbar 150 may also include at least one aluminum layer of the plurality of aluminum layers has a thickness that is dissimilar from the thicknesses of remaining layers. For example, as shown in the enlarged section 602 of FIG. 6, the busbar 150 comprises a topmost aluminum layer 604 having a thickness that is different from a thickness of the remaining aluminum layers 606. A thickness of the topmost aluminum layer 604 may range from 0.3 to 0.7 mm, or from 0.0.4 mm to 0.5 mm. A thicker top layer may make it easier to weld voltage sense taps (not shown) to the busbar 150 or offset 304 of the busbar 150. Though a thicker top layer may reduce flexibility the busbar 150 may be still significantly more flexible than that of a solid 2 mm thick bus bar.

Figure 7:
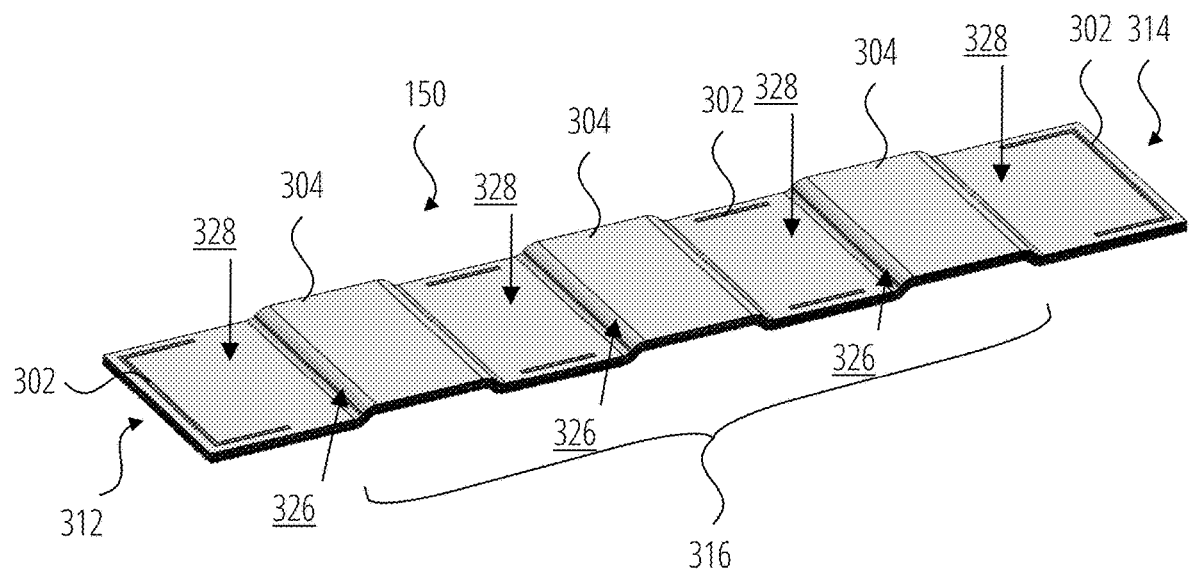
FIG. 7 depicts a perspective view of a busbar in accordance with an illustrative embodiment.

In one or more further embodiments, as shown in FIG. 7, the busbar has a body that includes a plurality of aluminum layers 308 stacked together, the body having a first end 312, a second end 314 opposite the first end, and a middle portion 316 disposed between the first end and the second end. The plurality of aluminum layers includes at least a first aluminum layer and a second aluminum layer stacked on one longitudinal surface of the first aluminum layer and secured to the first aluminum layer with one or more laser welds 302 at the first and second ends. The plurality of aluminum layers 308 may be configured to have a plurality of offsets 304 at the middle portion 316 such that the middle portion has a plurality of raised profiles 326 relative to a level profile 328 of the first or second ends. Further, the thickness of the busbar 150 maybe maintained throughout the length of the busbar. In the example of FIG. 7, the busbar 150 may connect 4 cell terminals 502.

Figure 8:
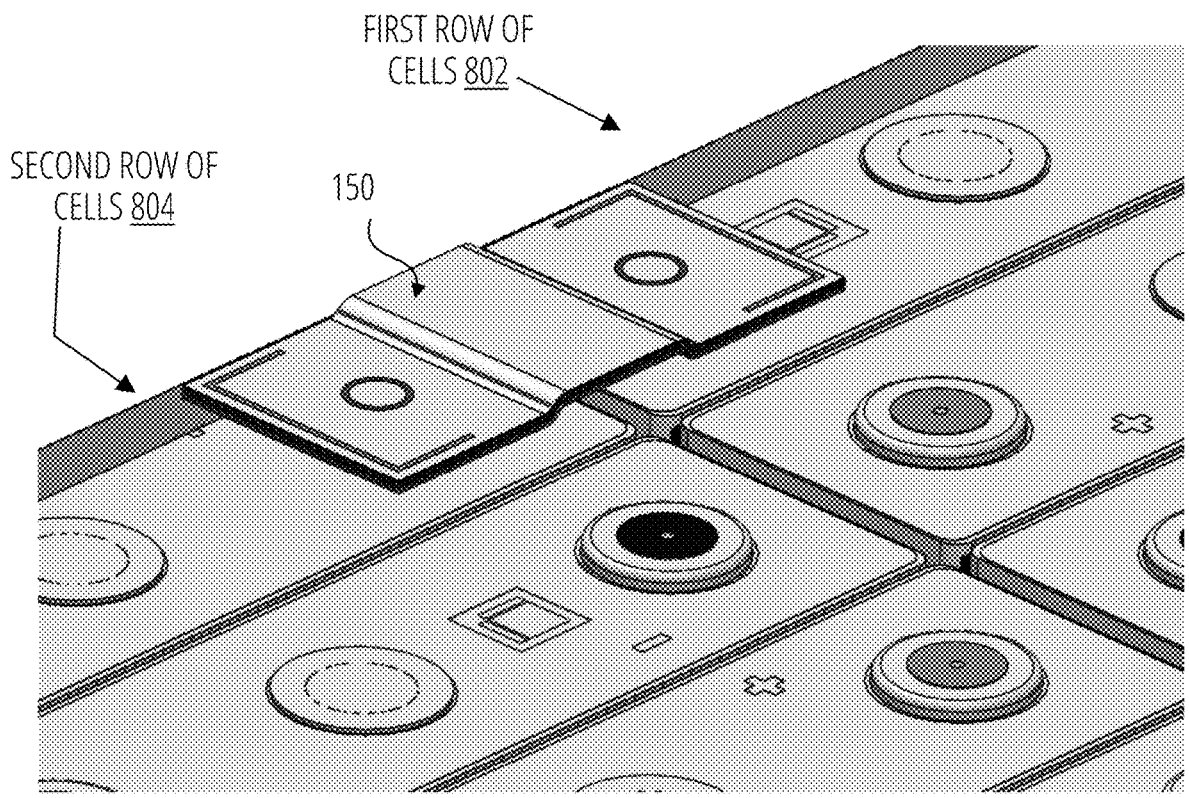
FIG. 8 depicts a sketch of cell connections in accordance with an illustrative embodiment.

The busbar 150 may further be used to connect across two cell stacks as shown in FIG. 8 wherein a first row of cells 802 is connected to a second row of cells 804.

Figure 9:
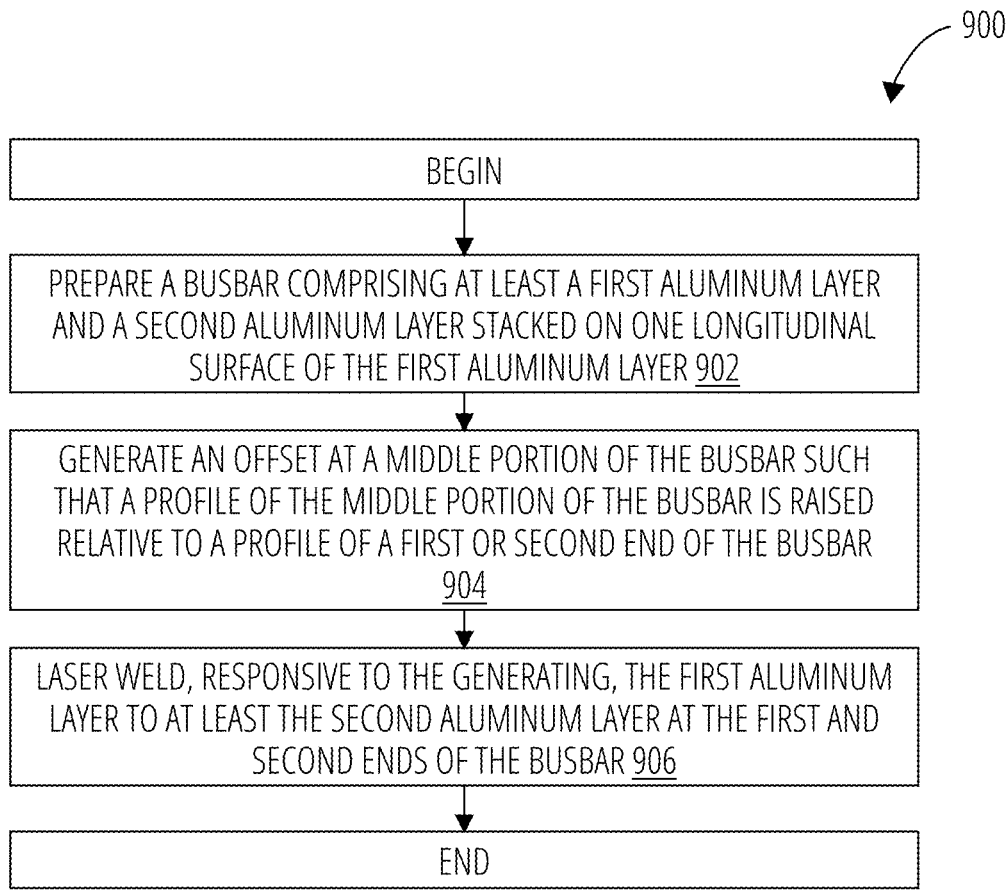
FIG. 9 depicts a flow chart showing a method in accordance with an illustrative embodiment.

Turning now to FIG. 9, a laser welding method 900 is disclosed. The method 900 may begin at step 902 wherein a plurality of aluminum layers is obtained. In step 902, the method may prepare a busbar comprising at least a first aluminum layer and a second aluminum layer stacked on one longitudinal surface of the first aluminum layer. In step 904, method 900 may generate an offset at a middle portion of the busbar such that a profile of the middle portion of the busbar is raised relative to a profile of a first or second end of the busbar. In step 906, method 900 may laser weld the first aluminum layer to at least the second aluminum layer at the first and second ends of the busbar. The method 900 ends thereafter.

Figure 10:
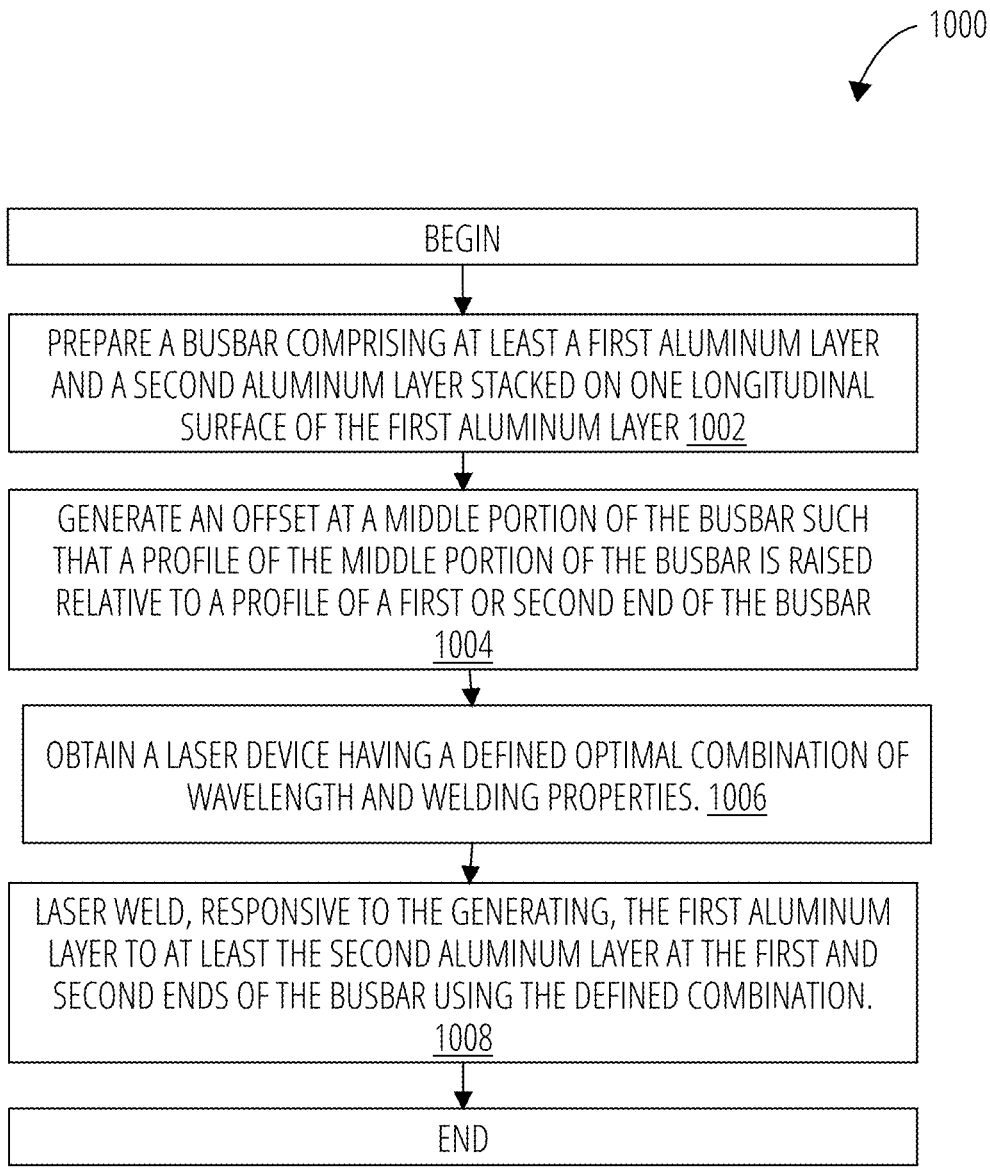
FIG. 10 depicts a flow chart showing method in accordance with an illustrative embodiment.

FIG. 10 shows a laser welding method 1000 using a laser device having a combination of welding techniques that may enable the laser welding of aluminum foils. In step 1002, method 1000 may prepare a busbar comprising at least a first aluminum layer and a second aluminum layer stacked on one longitudinal surface of the first aluminum layer. In step 1004, method 1000 may generate an offset at a middle portion of the busbar such that a profile of the middle portion of the busbar is raised relative to a profile of a first or second end of the busbar. In step 1006-step 1008, method 1000 may laser weld, responsive to the generating, the first aluminum layer to at least the second aluminum layer at the first and second ends of the busbar. In method 1000 laser welds the aluminum layers together using a laser device having a wavelength of 1070 nm (+/−5%, or +/−10%), a welding speed of about 20 mm/s (or ranging from 20-30 mm/s or 20-25 mm/s), a laser power of about 1400W (+/−5%, or +/−10%), a scan width of about 3 mm (+/−5%, or +/−10%), a scan frequency of about 200 Hz (+/−5%, or +/−10%). A head with a beam spot diameter at focus of 100 micron may also be used. The method 1000 ends thereafter. Of course, other defined wavelength and laser welding properties may be used as shown in the table below.

TABLE 2

Wavelength and laser welding properties.

| Laser Equipment | Property |
|---|---|
| Co2 laser | wavelength 10.6 micrometer, single mode or multi mode |
| Fiber lasers | wavelength between 500 nanometer and 2200 nanometer, single mode or multi mode or beam shaping |
| Disk Laser | wavelength between 500 nanometer and 2200 nanometer, single mode or multi mode or beam shaping |
| Direct diode lasers | wavelength between 500 nanometer and 2200 nanometer, single mode or multi mode or beam shaping |
| Blue laser | wavelength between 400 nanometer and 500 nanometer, single mode or multi mode |
| Welding head | Fix optics welding head Scanning optics/beam oscillation optics |

Figure 11:
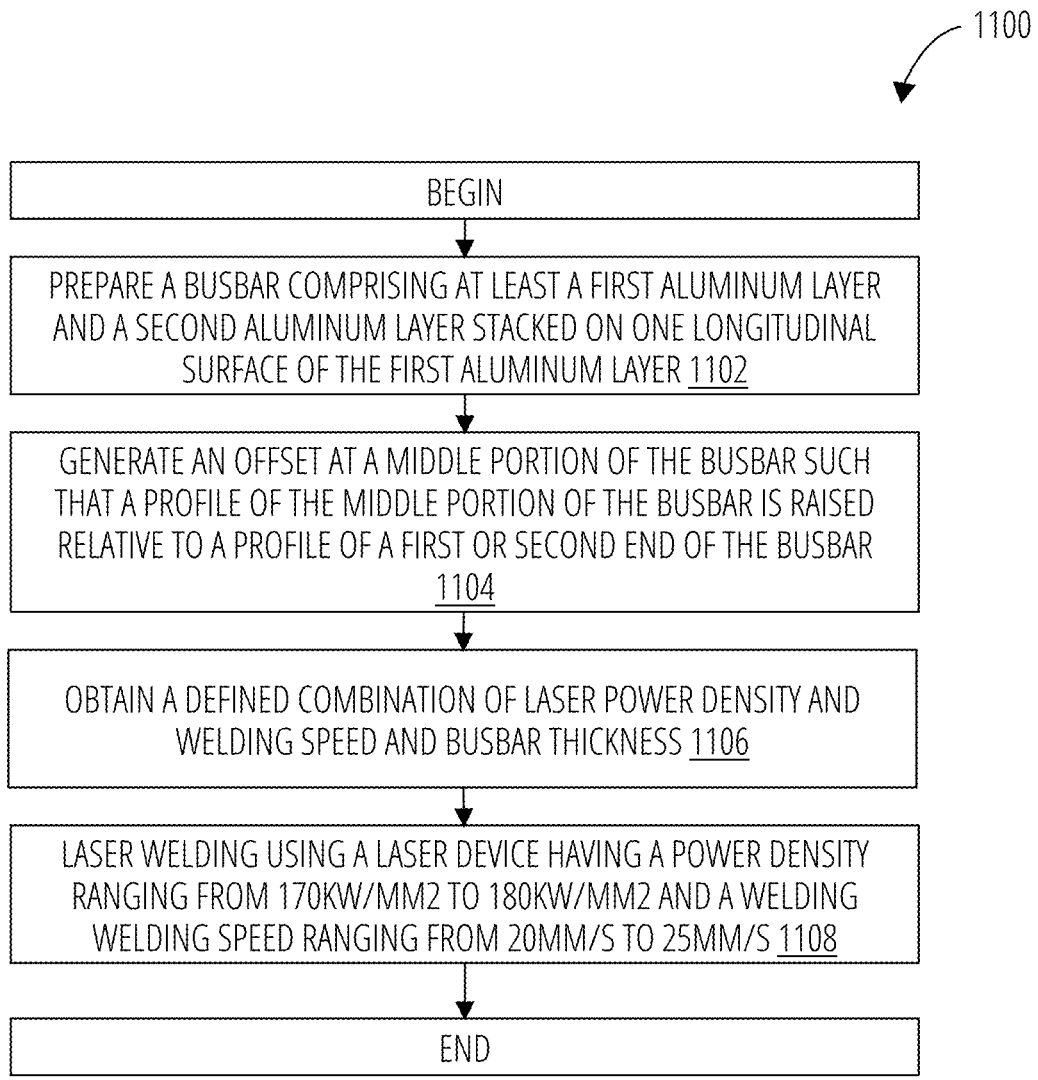
FIG. 11 depicts a flow chart showing a method in accordance with an illustrative embodiment.

In some other embodiments, the method recognizes that factors that may be considered during welding include material composition, thickness, power density and welding speed. The method recognizes that increasing a level of the power density may require a corresponding increase in the welding speed for the same material/thickness of the aluminum layers to be welded together. A laser power density of between 175 Kw/mm2 to 180 Kw/mm2 may be suitable for welding thin aluminum layers together. This may be accompanied by a welding speed of between 20 mm/s to 25 mm/s for a busbar of about 2 mm thickness having an offset height of between 1.5 mm to 2 mm. As shown in FIG. 11, in step 1102, method 1100 may prepare a busbar comprising at least a first aluminum layer and a second aluminum layer stacked on one longitudinal surface of the first aluminum layer. In step 1104, method 1100 may generate an offset at a middle portion of the busbar such that a profile of the middle portion of the busbar is raised relative to a profile of a first or second end of the busbar. In step 1106, method 1100 may obtain a defined combination of laser power density and welding speed for welding the plurality of aluminum layers that have a defined total thickness together. The method may then laser weld, the first aluminum layer to at least the second aluminum layer at the first and second ends of the busbar. In step 1108, method 1100 may laser weld the aluminum layers together using a laser device configured with the defined combination. The defined combination may include a power density ranging from 170 Kw/mm2 to 180 Kw/mm2 or 175 Kw/mm2 to 180 Kw/mm2 and a welding speed ranging from 20 mm/s to 25 mm/s. This may be used for a 2 mm aluminum busbar with an offset ranging from 1.5 mm to 2 mm. The method 1100 ends thereafter. Methods 900, 1000 and 1100 may be performed wholly or partly by a user such as a welder or computer or a combination of a welder and a computer. The computer may be part of a system having a processor and software configured to perform some or all the steps herein. The software may be stored in a non-transitory computer-readable storage medium and loaded into a memory. Control logic, when loaded and executed by the processor, causes the computer, to perform all or some of the some of the methods described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A busbar comprising: a body including a plurality of aluminum layers stacked together, the body having a first end, a second end opposite the first end, and a middle portion disposed between the first end and the second end; and the plurality of aluminum layers includes at least a first aluminum layer and a second aluminum layer stacked on one longitudinal surface of the first aluminum layer and secured to the first aluminum layer with one or more laser welds at the first and second ends, wherein the plurality of aluminum layers are configured to have an offset at the middle portion such that the middle portion has a raised profile relative to a profile of the first or second ends.

2. The busbar of claim 1, wherein the busbar is configured to have an aluminum layer thickness, an offset radius of curvature and an offset height that jointly provide a defined flexibility of the busbar in a plurality of axes, and a continuous current carrying capacity ranging from 100 A to 500 A.

3. The busbar of claim 2, wherein the defined flexibility is a minimum deflection of the busbar of 0.2 mm without needing to apply more than 300N each of opposing forces on two cell terminal welds of the busbar.

4. The busbar of claim 2, wherein a ratio of the offset height to a thickness of the busbar ranges from 0.75:1 to 1.5:1.

5. The busbar of claim 4, wherein the ratio of the offset height to the thickness of the busbar ranges from 1:1 to 1.5:1.

6. The busbar of claim 4, wherein all the plurality of layers are laser welded at said first and second ends.

7. The busbar of claim 2, wherein the offset height ranges from 1 mm to 4 mm.

8. The busbar of claim 7, wherein the offset height ranges from 1.5 mm to 3.0 mm.

9. The busbar of claim 2, wherein the aluminum layer thickness of each layer ranges from 0.05 mm to 0.2 mm.

10. The busbar of claim 9, wherein the aluminum layer thickness of each layer ranges from 0.10 mm to 0.13 mm.

11. The busbar of claim 2, wherein the offset radius of curvature ranges from 0.5 mm to 5 mm.

12. The busbar of claim 11, wherein the offset radius of curvature ranges from 1.0 mm to 2.0 mm.

13. The busbar of claim 2, wherein a topmost aluminum layer of the busbar has a thickness that is between 0.4 mm to 0.5 mm.

14. The busbar of claim 2, wherein the continuous current carrying capacity ranges from 200 A to 250 A.

15. The busbar of claim 1, wherein the plurality of aluminum layers comprises Aluminum 1100.

16. The busbar of claim 1, wherein at least one aluminum layer of the plurality of aluminum layers has a thickness that is dissimilar from the thicknesses of remaining layers.

17. A busbar comprising: a body including a plurality of aluminum layers stacked together, the body having a first end, a second end opposite the first end, and a middle portion disposed between the first end and the second end; and the plurality of aluminum layers includes at least a first aluminum layer and a second aluminum layer stacked on one longitudinal surface of the first aluminum layer and secured to the first aluminum layer with one or more laser welds at the first and second ends, wherein the plurality of aluminum layers are configured to have a plurality of offsets at the middle portion such that the middle portion has a plurality of raised profiles relative to a profile of the first or second ends.

18. The busbar of claim 17, wherein the middle portion has at least one level profile that matches or substantially matches the profile of the first or second ends.

19. A method comprising:
   laser welding a plurality of aluminum layers together by:
      preparing a busbar comprising at least a first aluminum layer and a second aluminum layer stacked on one longitudinal surface of the first aluminum layer;
      generating an offset at a middle portion of the busbar such that a profile of the middle portion of the busbar is raised relative to a profile of a first or second end of the busbar; and
      laser welding, responsive to the generating, the first aluminum layer to at least the second aluminum layer at the first and second ends of the busbar.

20. The method of claim 19, further comprising:
   laser welding using a laser device having a wavelength of about 1070 nm, a welding speed of about 20 mm/s, a laser power of about 1400W, a scan width of about 3 mm and a scan frequency of about 200 Hz.

21. The method of claim 19, further comprising:
   laser welding using a laser device having a power density ranging from 170 Kw/mm2 to 180 Kw/mm2 and a welding speed ranging from 20 mm/s to 25 mm/s,
   wherein the laser welding is responsive to selecting a busbar thickness to be a value ranging from 1 mm to 4 mm and an offset height to be a value ranging from 1 mm to 4 mm.

22. The method of claim 21, wherein the power density ranges from 175 Kw/mm2 to 180 Kw/mm2, the busbar thickness ranges from 1 mm to 2 mm and the offset ranges from 1.5 mm to 2 mm.

23. The method of claim 22, wherein the power density is 175 Kw/mm2.

24. The method of claim 22, wherein the busbar thickness is 2 mm.

25. The method of claim 19, further comprising:
   laser welding the busbar to one or more aluminum cell terminals of a battery pack.

26. The method of claim 19, further comprising:
   generating the offset of the busbar to occupy a low profile in comparison to conventional busbars, based on selecting a defined aluminum layer thickness, offset radius of curvature and offset height combination that jointly provide both a defined flexibility of the busbar in a plurality of axes and continuous current carrying capacity of between 100 A to 500 A.

* * * * *